United States Patent
Parekh et al.

(10) Patent No.: US 6,540,604 B1
(45) Date of Patent: Apr. 1, 2003

(54) APPARATUS FOR DIRECTING AIR FLOW TO A PASSENGER COMPARTMENT OF A MOTOR VEHICLE

(75) Inventors: Bipin D. Parekh, Plymouth, MI (US); Mark R. James, Northville, MI (US); Fred W. Butler, Oxford, MI (US)

(73) Assignees: Visteon Global Technologies, Inc., Dearborn, MI (US); TRW Inc., Lyndhurst, OH (US)

( * ) Notice: Subject to any disclaimer, the term of this patent is extended or adjusted under 35 U.S.C. 154(b) by 0 days.

(21) Appl. No.: 09/957,599

(22) Filed: Sep. 20, 2001

(51) Int. Cl.[7] .................................................. B60S 1/54
(52) U.S. Cl. ...................................... 454/121; 454/143
(58) Field of Search ........................ 454/69, 121, 143; 137/15, 315; 251/314, 316, 317

(56) References Cited

U.S. PATENT DOCUMENTS

| | | |
|---|---|---|
| 5,228,475 A | 7/1993 | Trill |
| 5,476,418 A | 12/1995 | Loup |
| 5,499,947 A * | 3/1996 | Tauber ..................... 137/15.08 |
| 5,967,890 A | 10/1999 | Loup et al. |
| 6,032,723 A * | 3/2000 | Tsuihiji et al. .............. 165/204 |
| 6,138,749 A | 10/2000 | Kawai et al. |
| 6,193,600 B1 * | 2/2001 | Ito et al. ........................ 454/69 |
| 6,305,462 B1 * | 10/2001 | Tsurushima et al. ......... 165/103 |

* cited by examiner

*Primary Examiner*—Derek Boles
(74) *Attorney, Agent, or Firm*—Tarolli, Sundheim, Covell & Tummino L.L.P.

(57) ABSTRACT

An apparatus (10) for directing a flow of air to a passenger compartment of a motor vehicle comprises a housing (12) including at least one passage (24) for conveying the flow of air to the passenger compartment. At least one door (26) has a first position for allowing the flow of air into the passage (24) and a second position for preventing the flow of air into the passage (24). The door (26) includes a seal (32) for sealing against the housing (12) when the door (26) is in the second position. The seal (32) includes a main body portion (106) for attaching to the door (26) and a sealing portion (122) for sealing against the housing (12). The sealing portion (122) of the seal (32) includes primary sealing means (124), which extends outwardly of the main body portion (106) of the seal (32) in a first direction, and secondary sealing means (130), which extends outwardly of the main body portion (106) of the seal (32) in a second direction that is different from the first direction.

16 Claims, 3 Drawing Sheets

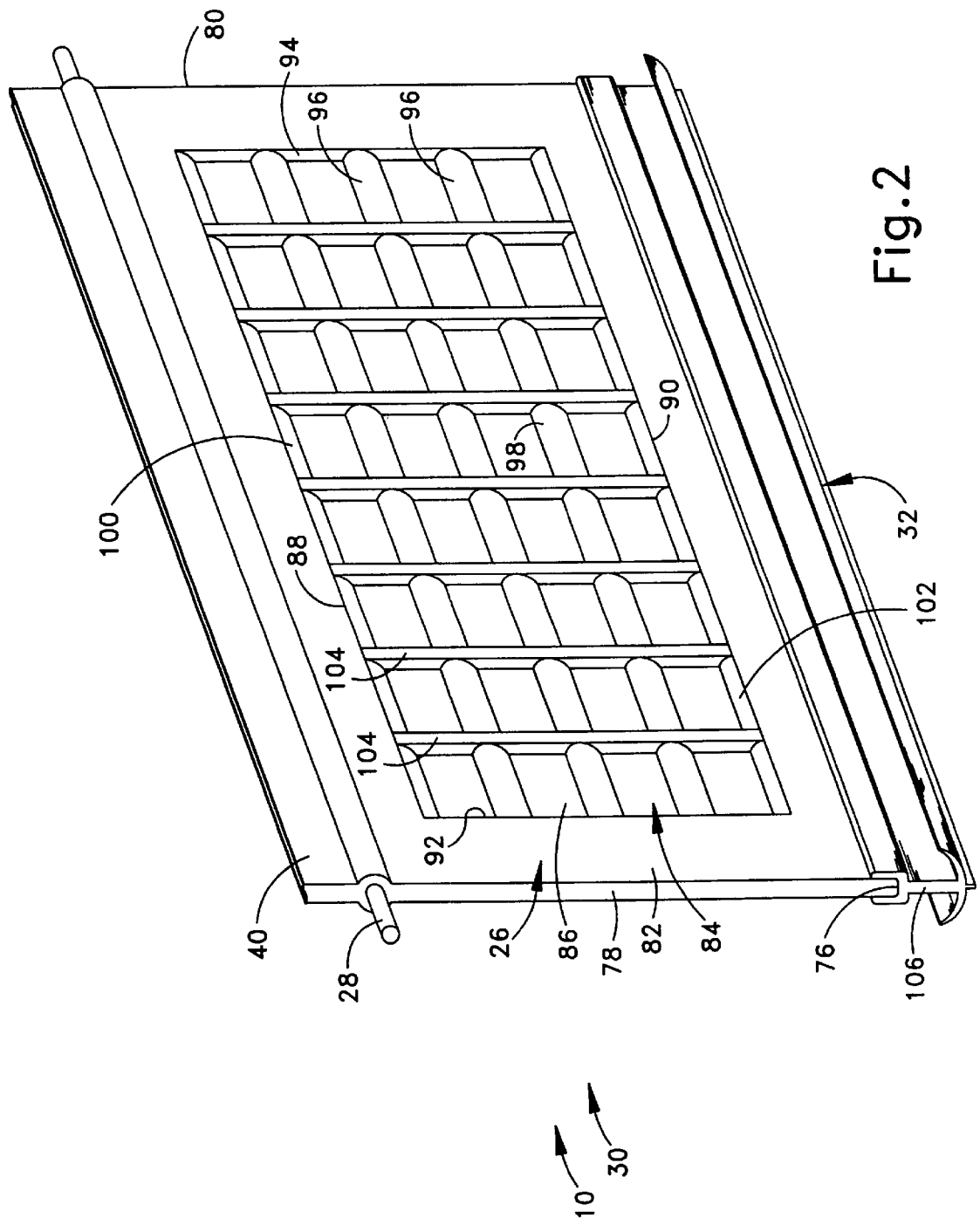

APPARATUS FOR DIRECTING AIR FLOW TO A PASSENGER COMPARTMENT OF A MOTOR VEHICLE

TECHNICAL FIELD

The present invention relates to an apparatus for directing a flow of air to a passenger compartment of a motor vehicle.

BACKGROUND OF THE INVENTION

A known apparatus for directing a flow of air to a passenger compartment of a motor vehicle includes a door having a seal. The seal includes a main body portion and a sealing portion. The main body portion includes a recess for receiving a portion of the door. The sealing portion extends outwardly of the main body portion of the seal in a direction parallel to the door. The sealing portion of the seal is a flat and elongated member that contacts a portion of the housing when the door is in a closed position.

Since the sealing portion of the seal of the known apparatus is flat and elongated, the entire sealing portion strikes the housing at the same time when the door is moved to the closed position. This striking of the seal against the housing creates a noise that is generally audible in the passenger compartment of the vehicle. Additionally, the flow of air over the seal when the door is in the closed position may catch an outer end of the flat sealing portion and cause the sealing portion of the seal to flutter. Flutter of the seal may also be audible in the passenger compartment of the vehicle.

The door of the known apparatus includes opposite sides, each side having a recessed surface. A first plurality of ribs extends longitudinally across each recess of the door. A second plurality of ribs extends laterally across each recess of the door, perpendicular to the first plurality of ribs. The ribs of both the first and second pluralities have rectangular cross-sections with depths equal to the depth of the recesses. During the flow of air over the door of the known apparatus, moisture that is carried in the air may become trapped in the regions between intersecting ribs. The trapped moisture may result in mildew forming on the door. The mildew may result in the air flowing over the door acquiring an odor that is detectable in the passenger compartment of the vehicle.

SUMMARY OF THE INVENTION

In accordance with one aspect, the present invention includes an apparatus for directing a flow of air to a passenger compartment of a motor vehicle. The apparatus comprises a housing including at least one passage for conveying the flow of air to the passenger compartment. At least one door has a first position for allowing the flow of air into the passage and a second position for preventing the flow of air into the passage. The door includes a seal for sealing against the housing when the door is in the second position. The seal includes a main body portion for attaching to the door and a sealing portion for sealing against the housing. The sealing portion of the seal includes primary sealing means, which extends outwardly of the main body portion of the seal in a first direction, and secondary sealing means, which extends outwardly of the main body portion of the seal in a second direction that is different from the first direction.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is a perspective view of a door of the apparatus of FIG. 1;

DESCRIPTION OF AN EXAMPLE EMBODIMENT

Figure 1:
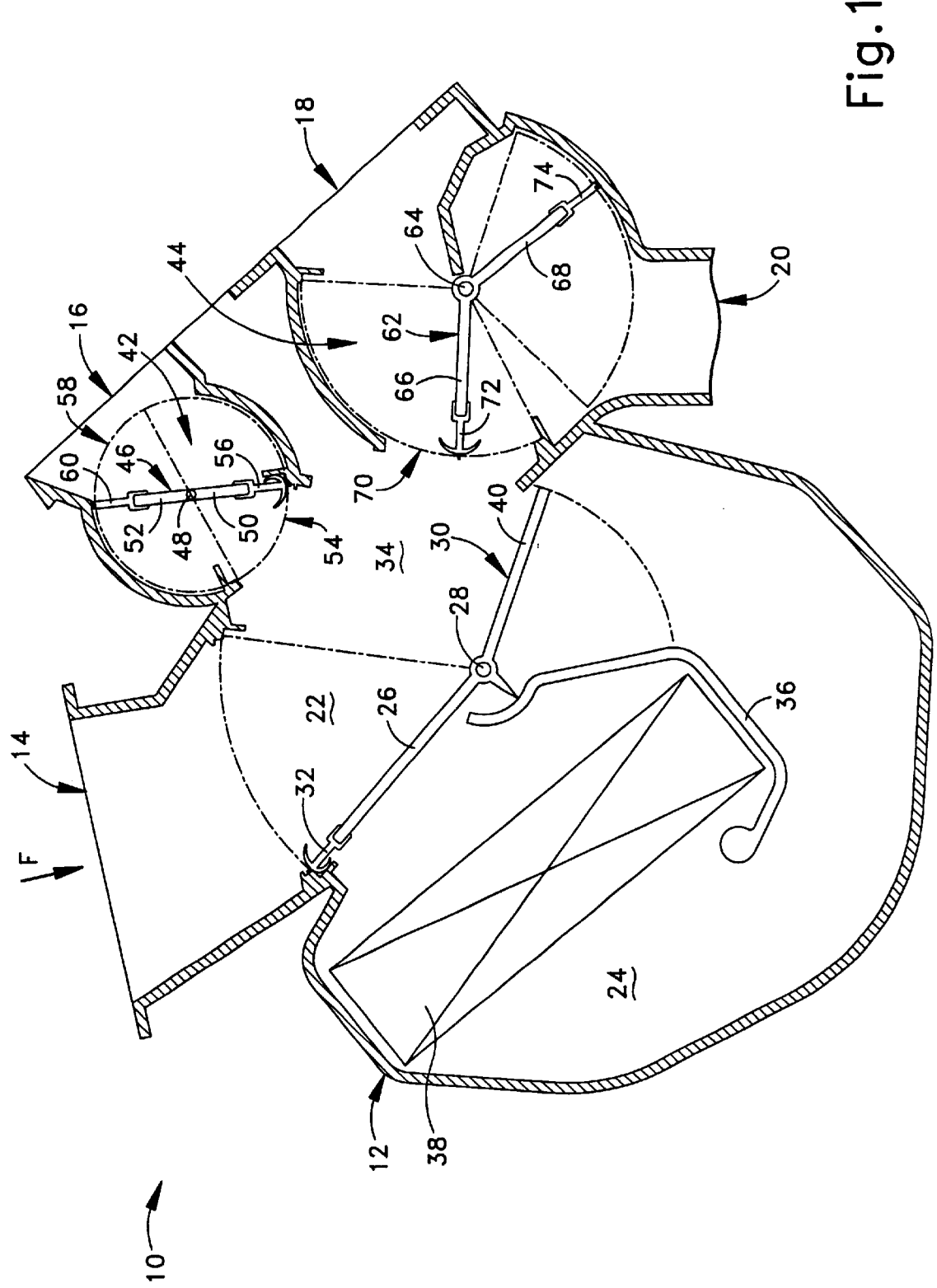
FIG. 1 is a cross-section of a vehicle heating and ventilating apparatus constructed in accordance with the present invention.

FIG. 1 is a cross-section of a vehicle heating and ventilating apparatus 10 constructed in accordance with the present invention. The apparatus 10 illustrated in FIG. 1 includes a housing 12 having a single air inlet passage 14 and three air outlet passages. The three air outlet passages include a defrost air passage 16, a panel air passage 18, and a floor air passage 20. Each of the three air outlet passages 16, 18, and 20 conveys the flow of air to a portion of a passenger compartment (not shown) of a vehicle (not shown).

A flow of air, shown schematically in FIG. 1 as F, is received in the housing 12 of the apparatus 10 through the air inlet passage 14. Within the housing 12, the air inlet passage 14 divides into a ventilation passage 22 and a heating passage 24. A first door 26 extends from a first hinge 28 within the housing 12 and terminates in a position within the air inlet passage 14. The first door 26 forms a portion of a first flap valve 30 and is movable between various positions within the air inlet passage 14 to direct the flow of air passing through the air inlet passage 14 to either or both of the ventilation passage 22 or the heating passage 24 within the housing 12. The first door 26 includes a seal 32, the construction of which will be discussed in detail below.

The housing 12 of the apparatus 10 includes a main mixing chamber 34. Both the ventilation passage 22 and the heating passage 24 feed into the main mixing chamber 34. The ventilation passage 22 is partially defined by the first flap valve 30. The heating passage 24 is partially defined by a wall 36 within the housing 12. The heating passage includes a heat exchanger 38.

The first flap valve 30 also includes a second door 40. The second door 40 extends from the first hinge 28 into the heating passage 24 near the main mixing chamber 34. The second door 40 regulates the flow of air out of the heating passage 24 and prevents the back flow of air from the main mixing chamber 34 into the heating passage 24. The second door 40 of the first flap valve 30 is fixed relative to the first door 26 and is movable with the first door 26 about the first hinge 28.

The main mixing chamber 34 of the housing 12 is in fluid communication with first and second cylindrical chambers 42 and 44. The first cylindrical chamber 42 provides access to and is in fluid communication with the defrost air passage 16. The second cylindrical chamber 44 provides access to and is in fluid communication with both the panel air passage 18 and the floor air passage 20.

A second flap valve 46 is located in the first cylindrical chamber 42. The second flap valve 46 is rotatable about a second hinge 48 and includes a third door 50 and a fourth door 52. The third door 50 extends from the second hinge 48 into an opening 54 between the first cylindrical chamber 42 and the main mixing chamber 34. The third door 50 includes a seal 56 constructed in accordance with the present invention. The fourth door 52 extends from the second hinge 48 into an opening 58 between the first cylindrical chamber 42 and the defrost air passage 16. The fourth door 52 includes a flat seal 60. The second flap valve 46 is movable between an open position where the flow of air may pass through the first cylindrical chamber 42 and into the defrost air passage 16 and a closed position (shown in FIG. 1) where the flow of air is prevented from passing through the first cylindrical chamber 42 and into the defrost air passage 16.

A third flap valve 62 is located in the second cylindrical chamber 44. The third flap valve 62 is rotatable about a third hinge 64. The third flap valve 62 includes a fifth door 66 and a sixth door 68. The fifth door 66 extends from the third hinge 64 into an opening 70 between the second cylindrical chamber 44 and the main mixing chamber 34. The fifth door 66 includes a seal 72 constructed in accordance with the present invention. The sixth door 68 extends from the third hinge 64 in a direction opposite the fifth door 66 and is used to regulate the flow of air through the floor air passage 20. The sixth door 68 includes a flat seal 74.

The third flap valve 62 is rotatable about the third hinge 64 to regulate the flow of air into both the panel air passage 18 and the floor air passage 20. The third flap valve 62 may be rotated about the third hinge 64 to allow the flow of air into both the panel air passage 18 and the floor air passage 20 (shown in FIG. 1), to allow the flow of air into only one of the panel air passage 18 and the floor air passage 20, or to prevent the flow of air into both the panel air passage 18 and the floor air passage 20.

The apparatus 10 also includes means (not shown) for adjusting the position of each of the flap valves 30, 46, and 62. Such means may include a stepper motor (not shown). The driver of the vehicle controls the position of each flap valve 30, 46, and 62 by adjusting the position of a control knob (not shown) that is located within the passenger compartment of the vehicle.

When the flap valves 30, 46, and 62 are located in the positions shown in FIG. 1, the first door 26 of the first flap valve 30 directs air into the ventilation passage 22 and prevents air from entering the heating passage 24. The air entering the housing 12 passes over the first door 26 and through the ventilation passage 22 to the main mixing chamber 34. Since no air passes through the heating passage 24 of the apparatus 10, no heated air is mixed with the air in the main mixing chamber 34. The second door 40 of the first flap valve 30 prevents the air from back flowing into the heating passage 24 from the main mixing chamber 34.

From the main mixing chamber 34, the air attempts to flow through the first and second cylindrical chambers 42 and 44. Since the second flap valve 46 is in a closed position, air is prevented from passing through the first cylindrical chamber 42 and into the defrost air passage 16. The third flap valve 62, however, is located in a position to allow the air to flow through the second cylindrical chamber 44 and into both the panel air passage 18 and the floor air passage 20. The air flowing into the panel air passage 18 and into the floor air passage 20 is conveyed toward the panel and the floor of the passenger compartment of the vehicle.

FIG. 1 shows a single embodiment of the housing 12 of the apparatus 10 of the present invention. Alternate embodiments of the housing 12 are contemplated by the present invention.

In the embodiment illustrated in FIG. 1, each flap valve 30, 46, and 62 includes two doors. Although the physical size of each door may vary, preferably each door is constructed in a similar manner. As an example of the construction for the doors of the apparatus 10, the first door 26 will be described in detail.

Referring to FIG. 2, the first door 26 is generally rectangular and includes opposite first and second sides, only the first side is shown. The first door 26 extends longitudinally from the first hinge 28 to a first terminal end 76 and laterally from a first side surface 78 to a second side surface 80. Preferably, the first door 26 is molded from plastic.

The first side of the first door 26 includes a first outer surface 82. A first recess 84 extends into the first outer surface 82 of the first door 26 and terminates at a first recessed surface 86. Four recess side walls define the outer periphery of the first recess 84. The four recess side walls extend perpendicularly to the plane of the first outer surface 82 to connect the first outer surface 82 to the first recessed surface 86. The four recess side walls include an upper recess side wall 88, a lower recess side wall 90, a left recess side wall 92, and a right recess side wall 94. Preferably, a depth of the first recess 84 into the first side of the first door 26 is no more than one-third of the thickness of the first door 26. The thickness of the first door 26 is defined as the distance between the first side and the second side of the first door 26.

A first plurality of ribs 96 extends laterally across the first recess 84 and connects the left recess side wall 92 to the right recess side wall 94. The first plurality of ribs 96 adds rigidity to the first door 26 so that the first door 26 may withstand a load applied by a pressure of the flow of air upon the first door 26. The ribs 96 preferably extend in a direction parallel to the upper and lower recess side walls 88 and 90. Each of the ribs 96 of the first plurality of ribs 96 includes a curved outer surface 98 and has a maximum depth that is equal to the depth of the first recess 84. Preferably, a first rib 100 of the first plurality of ribs 96 abuts the upper recess side wall 88 so that a peak of the first rib 100 is located in the plane of the first outer surface 82. Preferably, a second rib 102 of the first plurality of ribs 96 abuts the lower recess side wall 90 so that a peak of the second rib 102 is located in the plane of the first outer surface 82.

The curved outer surfaces 98 of the first plurality of ribs 96 enables the first door 26 to shed moisture that may be contained in the flow of air that passes over the first door 26. As shown in FIG. 1, the flow of air travels longitudinally over the first door 26. The curved outer surfaces 98 of the ribs 96 allow moisture that forms in the first recess 84 to exit the first recess 84 of the first door 26. When moisture is removed from the first recess 84 of the first door 26, the likelihood of mildew forming on the first door 26 is decreased.

A second plurality of ribs 104 extends longitudinally across the first recess 84 and connects the upper recess side wall 88 to the lower recess side wall 90. The second plurality of ribs 104 adds further rigidity to the first door 26. The ribs 104 of the second plurality of ribs 104 preferably extend in a direction parallel to the left and right recess side walls 92 and 94. The ribs 104 of the second plurality of ribs 104 may be of any configuration, but preferably have a rectangular cross-section with a depth equal to the depth of the first recess 84.

Although not shown, the second side of the first door 26 is identical to the first side of the first door 26. The second side of the first door 26 includes a second outer surface (not shown). A second recess (not shown) extends into the second outer surface of the first door 26 and terminates at a second recessed surface (not shown). Four recess side walls (not shown) extend perpendicularly to the plane of the second outer surface to connect the second outer surface to the second recessed surface.

A third plurality of ribs (not shown) extends laterally across the second recess. The third plurality of ribs adds rigidity to the first door 26. Each of the ribs of the third plurality of ribs includes a curved outer surface (not shown) and has a maximum depth that is equal to the depth of the second recess for shedding moisture that may be contained in the flow of air that passes over the first door 26. The flow of air passes over the second side of the first door 26 when the first door 26 is opened to allow the flow of air into the heating passage 24.

A fourth plurality of ribs (not shown) extends longitudinally across the second recess. The fourth plurality of ribs adds further rigidity to the first door 26. The ribs of the fourth plurality of ribs may be of any configuration, but preferably have a rectangular cross-section with a depth equal to the depth of the second recess.

Figure 3:
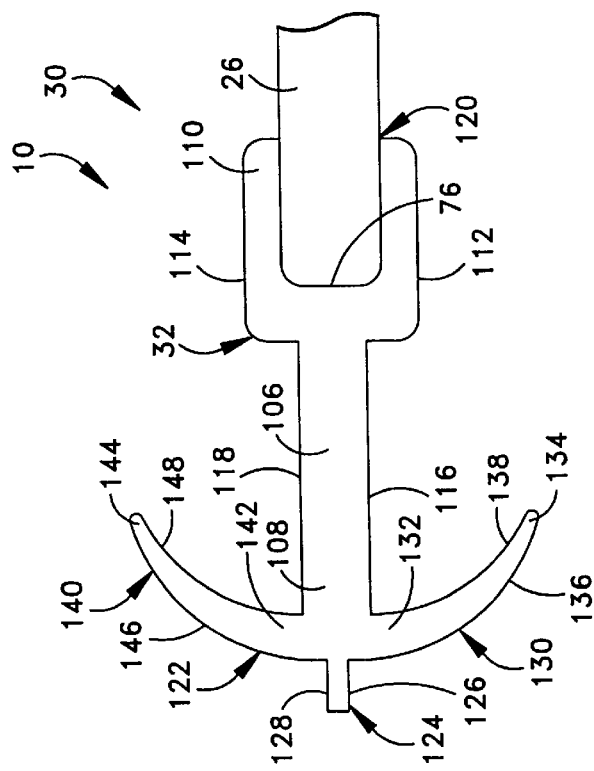
FIG. 3 is cross-section of a seal of the apparatus of FIG. 1.

The first door 26 also includes a seal 32 that is constructed in accordance with the present invention. The seal 32 is preferably made from an elastomer, such as a blend of ethylene-propylene rubber and polypropylene marketed by Monsanto Company of St. Louis, Mo. under the trademark SANTOPRENE. The seal 32 has a generally anchor shaped cross-section, as illustrated in FIG. 3.

The seal 32 includes a longitudinally extending main body portion 106. The main body portion 106 includes a narrow end 108 and a wide end 110. The wide end 110 of the main body portion 106 includes a first side surface 112 and a second side surface 114. The wide end 110 of the main body portion 106 of the seal 32 has a thickness, defined as the distance between the first and second side surfaces 112 and 114, of approximately three times a thickness of the narrow end 108 of the main body portion 106. The thickness of the narrow end 108 of the main body portion 106 is the distance between a first side surface 116 and a second side surface 118 of the narrow end 108 of the main body portion 106. The wide end 110 of the main body portion 106 extends longitudinally for approximately forty percent of the longitudinal length of the main body portion 106 of the seal 32. The narrow end 108 of the main body portion 106 forms the remainder of the longitudinal length of the main body portion 106 of the seal 32.

The wide end 110 of the main body portion 106 includes a recess 120 for receiving a portion of the door 26. To affix the seal 32 to the door 26, an adhesive is inserted into the recess 120 of the seal 32 and then, the terminal end 76 of the door 26 is inserted into the recess 120. The adhesive helps to maintain the seal 32 securely on the door 26.

A sealing portion 122 of the seal 32 extends from the narrow end 108 of the main body portion 106 of the seal 32. The sealing portion 122 includes three members. A first member 124 of the sealing portion 122 extends longitudinally outwardly from the main body portion 106 of the seal 32. The first member 124 has a generally rectangular cross-section and includes a first side surface 126 and a second side surface 128. The first member 124 has a thickness, defined as the distance between the first and second side surfaces 126 and 128, of approximately one-fourth the thickness of the narrow end 108 of the main body portion 106 of the seal 32. The first member 124 extends longitudinally outward of the narrow end 108 of the main body portion 106 of the seal 32 a distance of approximately ten percent of the longitudinal length of the main body portion 106 of the seal 32.

A second member 130 of the sealing portion 122 of the seal 32 extends outward of the first side 116 of the narrow end 108 of the main body portion 106 of the seal 32. The second member 130 includes an inner end 132 and an outer end 134. The inner end 132 of the second member 130 connects to the main body portion 106 of the seal 32. The second member 130 initially extends perpendicularly outwardly of the main body portion 106 of the seal 32 and then curves toward the wide end 110 of the main body portion 106 as the second member 130 extends from the inner end 132 to the outer end 134. The second member 130 also includes an outer side surface 136 and an inner side surface 138. The thickness of the second member 130, defined as the distance between the outer side surface 136 and the inner side surface 134, narrows from the inner end 132 to the outer end 134. The distance between the inner end 132 and the outer end 134 of the second member 130 is approximately sixty percent of the longitudinal length of the main body portion 106 of the seal 32.

A third member 140 of the sealing portion 122 of the seal 32 is a mirror-image of the second member 130. The third member 140 of the sealing portion 122 of the seal 32 extends outward of the second side 118 of the narrow end 108 of the main body portion 106 of the seal 32. The third member 140 includes an inner end 142 and an outer end 144. The inner end 142 of the third member 140 connects to the main body portion 106 of the seal 32. The third member 140 initially extends perpendicularly outwardly of the main body portion 106 of the seal 32 and then curves toward the wide end 110 of the main body portion 106 as the third member 140 extends from the inner end 142 to the outer end 144. The third member 140 also includes an outer side surface 146 and an inner side surface 148. The thickness of the third member 140, defined as the distance between the outer side surface 146 and the inner side surface 148, narrows from the inner end-142 to the outer end 144. The distance between the inner end 142 and the outer end 144 of the third member 140 is approximately sixty percent of the longitudinal length of the main body portion 106 of the seal 32.

Figure 4:
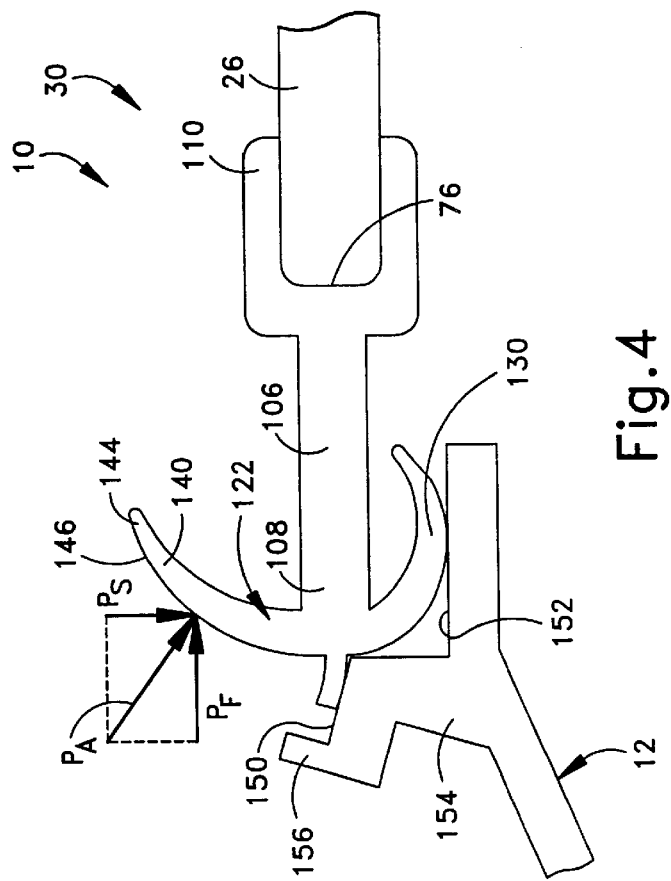
FIG. 4 is a view of the seal of FIG. 3 in engagement with a portion of the housing of the apparatus of FIG. 1.

When the first door 26 is in the closed position shown in FIG. 1, the seal 32 of the first door 26 contacts a portion of the housing 12 to prevent the flow of air into the heating passage 24 of the housing 12 of the apparatus 10. The portion of the housing 12 that is contacted by the seal 32 is layered, as is best shown in FIG. 4. A first sealing surface 150 of the housing 12 is located above a second sealing surface 152 of the housing 12. A distance of approximately one-half the length of the second member 130 of the sealing portion 122 of the seal 32 separates the first sealing surface 150 of the housing 12 from the second sealing surface 152 of the housing 12. The first sealing surface 150 is located on a pedestal 154 that extends outwardly from the second sealing surface 152 of the housing 12. A short lip 156 extends outwardly from an end of the first sealing surface 150, opposite the second sealing surface 152.

During use in the apparatus 10, the first door 26 of the first flap valve 30 may be in a position to close the ventilation passage 22, in a position to close the heating passage 24, or in a position where both the ventilation passage 22 and the heating passage 24 are partially open. In any of these positions, the flow of air passes over the first door 26 in a manner such that the seal 32 is upstream of the first recess 84 of the first door 26 and the first hinge 28 is downstream of the first recess 84 of the first door 26.

When the first door 26 is in a position allowing air to flow into both the ventilation passage 22 and the heating passage 24, the second and third members 130 and 140 of the sealing portion 122 of the seal 32 curve in the direction of the flow of air so that the air flows smoothly over the seal 32. As the door 26 is moved toward the closed position illustrated in FIG. 1, the outer end 134 of the second member 130 of the sealing portion 122 of the seal 32 initially engages the second sealing surface 152 of the housing 12. The position of initial engagement between the second member 130 and the second sealing surface 152 of the housing 12 is prior to the door 26 being in the closed position.

As the door 26 moves from the position of initial engagement to the closed position, the second member 130 flexes to dampen a force of contact between the first member 124 and the first sealing surface 150 of the housing 12. By dampening the force of contact, noise created by moving the first door 26 to the closed position is reduced. While flexing, during movement from the position in initial engagement to the closed position, the amount of surface area of the second member 130 that engages the second sealing surface 152 of the housing 12 increases.

The second member 130 continues to flex until the first door 26 is in the closed position. FIG. 4 illustrates the second member 130 in a completely flexed position. When in the closed position, the first member 124 of the sealing portion 122 of the seal 32 contacts the first sealing surface 150 of the housing 12. The contact between the first member 124 of the sealing portion 122 of the seal 32 and the first sealing surface 150 of the housing 12 forms a primary seal between the first door 26 and the housing 12. The contact between the second member 130 of the sealing portion 122 of the seal 32 and the second sealing surface 152 of the housing 12 forms a secondary seal between the first door 26 and the housing 12. The lip 156 that extends outwardly from the first sealing surface 150 of the housing 12 helps to prevent the flow of air from lifting the first member 124 of the sealing portion 122 away from the first sealing surface 150 of the housing 12 and causing the first member 124 of the seal 32 to flap.

When the first door 26 is in the closed position illustrated in FIGS. 1 and 4, the third member 140 of the sealing portion 122 of the seal 32 extends outwardly into the flow of air. The flow of air over the third member 140 of the sealing portion 122 places air pressure on the third member 140 in a direction normal to the outer side surface 146 of the third member 140. The air pressure is indicated schematically in FIG. 4 at $P_A$. The air pressure $P_A$ may be broken into a first vector component, $P_F$, that causes the third member 140 to flex so that the outer end 144 of the third member 140 moves inwardly toward the main body portion 106 of the seal 32 and a second vector component, $P_S$, that pushes the third member 140 toward the main body portion 106 of the seal 32. The second vector component $P_S$ also pushes the seal 32 toward the housing 12 to further prevent flapping of the seal 32.

When the first door 26 is moved to a closed position in which the flow of air into the ventilation passage 22 of the housing 12 is prevented, the third member 140 of the sealing portion 122 engages the housing 12 to form the secondary seal and the second member 130 of the sealing portion 122 extends into the flow of air. As a result, both the first and the second sides of the seal 32 may be used to seal against the housing.

From the above description of the invention, those skilled in the art will perceive improvements, changes and modifications. For example, instead of being curved, the second and third members 130 and 140 of the sealing portion 122 of the seal 32 may be formed from a plurality of angled segments. Such improvements, changes and modifications within the skill of the art are intended to be covered by the appended claims.

Having described the invention, we claim the following:

1. An apparatus for directing a flow of air to a passenger compartment of a motor vehicle, the apparatus comprising:
    a housing including at least one passage for conveying the flow of air to the passenger compartment; and
    at least one door having an end, the door having a first position for allowing the flow of air into the passage and a second position for preventing the flow of air into the passage;
    the end of the door including a seal for sealing against the housing when the door is in the second position, the seal including a main body portion for attaching to the end of the door and a sealing portion for sealing against the housing, the sealing portion of the seal including primary sealing means, which extends outwardly of the main body portion of the seal in a first direction, and secondary sealing means, which extends outwardly of the main body portion of the seal in a second direction that is different from the first direction, both the primary and the secondary sealing means contacting the housing when the door is in the second position so as to form primary and secondary seals at the end of the door.

2. An apparatus for directing a flow of air to a passenger compartment of a motor vehicle, the apparatus comprising:
    a housing including at least one passage for conveying the flow of air to the passenger compartment; and
    at least one door having an end, the door having a first position for allowing the flow of air into the passage and a second position for preventing the flow of air into the passage;
    the end of the door including a seal for sealing against the housing when the door is in the second position, the seal including a main body portion for attaching to the end of the door and a sealing portion for sealing against the housing, the sealing portion of the seal including primary sealing means, which extends outwardly of the main body portion of the seal in a first direction, and secondary sealing means, which extends outwardly of the main body portion of the seal in a second direction that is different from the first direction, wherein the secondary sealing means contacts the housing during movement of the door from the first position to the second position and the primary sealing means contacts the housing when the door reaches the second position, the secondary sealing means flexing during movement from a position of initial engagement with the housing to the second position to dampen a force of contact between the primary sealing means and the housing.

3. The apparatus as defined in claim 2 wherein surface area of the secondary sealing means that engages the housing increases as the secondary sealing means flexes during movement from the position of initial engagement to the second position.

4. The apparatus as defined in claim 3 wherein the secondary sealing means of the seal has an inner end and an outer end, the inner end being connected to the main body portion of the seal, the secondary sealing means curving from the inner end to the outer end.

5. The apparatus as defined in claim 4 wherein the outer end of the secondary sealing means of the seal initially contacts the housing, contact between the secondary sealing means and the housing gradually moving from the outer end of the secondary sealing means toward the inner end of the secondary sealing means as the secondary sealing means flexes during movement from the position of initial engagement to the second position.

6. The apparatus as defined in claim 4 wherein the secondary sealing means narrows as it curves from the inner end to the outer end.

7. An apparatus for directing a flow of air to a passenger compartment of a motor vehicle, the apparatus comprising:

a housing including at least one passage for conveying the flow of air to the passenger compartment; and at least one door having an end, the door having a first position for allowing the flow of air into the passage and a second position for preventing the flow of air into the passage;

the end of the door including a seal for sealing against the housing when the door is in the second position, the seal including a main body portion for attaching to the end of the door and a sealing portion for sealing against the housing, the sealing portion of the seal including primary sealing means, which extends outwardly of the main body portion of the seal in a first direction, and secondary sealing means, which extends outwardly of the main body portion of the seal in a second direction that is different from the first direction, wherein the primary sealing means of the seal extends outwardly from the main body portion of the seal in a direction parallel to the main body portion of the seal.

8. An apparatus for directing a flow of air to a passenger compartment of a motor vehicle, the apparatus comprising:

a housing including at least one passage for conveying the flow of air to the passenger compartment; and at least one door having a first position for allowing the flow of air into the passage and a second position for preventing the flow of air into the passage;

the door including a seal for sealing against the housing when the door is in the second position, the seal including a main body portion for attaching to the door and a sealing portion for sealing against the housing, the sealing portion of the seal including primary sealing means, which extends outwardly of the main body portion of the seal in a first direction, and secondary sealing means, which extends outwardly of the main body portion of the seal in a second direction that is different from the first direction, wherein the seal further includes a member that extends outwardly of a main body portion of the seal in a direction opposite the secondary sealing means and is subjected to air pressure from the flow of air when the door is in the second position, the member being configured to push the primary and secondary sealing means of the seal toward the housing when subjected to the air pressure.

9. The apparatus as defined in claim 8 wherein the member of the seal is a mirror-image of the secondary sealing means of the seal.

10. The apparatus as defined in claim 8 wherein the member of the seal has an inner end and an outer end, the inner end being connecting to the main body portion of the seal, the member being flexible and curving from the inner end to the outer end, when subjected to air pressure the member flexing so that the outer end moves inwardly toward the main body portion of the seal.

11. An apparatus for directing a flow of air to a passenger compartment of a motor vehicle, the apparatus comprising:

a housing including at least one passage for conveying the flow of air to the passenger compartment; and at least one door having a first position for allowing the flow of air into the passage and a second position for preventing the flow of air into the passage;

the door including a seal for sealing against the housing when the door is in the second position, the seal including a main body portion for attaching to the door and a sealing portion for sealing against the housing, the sealing portion of the seal including primary sealing means, which extends outwardly of the main body portion of the seal in a first direction, and secondary sealing means, which extends outwardly of the main body portion of the seal in a second direction that is different from the first direction, wherein the door includes a first outer surface, a first recess extending into the first outer surface and terminating at a first recessed surface, the flow of air traveling longitudinally over the first outer surface and first recessed surface of the door, a first plurality of ribs extending laterally across the first recess for providing structural rigidity to the door, the first plurality of ribs having curved outer surfaces for shedding moisture that may be carried in the flow of air.

12. The apparatus as defined in claim 11 wherein a second plurality of ribs extends longitudinally across the recess for providing additional structural rigidity to the door.

13. The apparatus as defined in claim 11 wherein the seal extends across the lateral extent of the door in a location upstream of the first recess.

14. The apparatus as defined in claim 13 wherein a laterally extending hinge forms an end portion of the door in a location downstream of the first recess.

15. The apparatus as defined in claim 11 wherein the door has a second outer surface opposite the first outer surface, a second recess extending into the second outer surface and terminating at a second recessed surface, a second plurality of ribs extending laterally across the second recess for providing structural rigidity to the door, the second plurality of ribs also having curved outer surfaces for shedding moisture that may be carried in the flow of air.

16. An apparatus for directing a flow of air to a passenger compartment of a motor vehicle, the apparatus comprising:

a housing including at least one passage for conveying the flow of air to the passenger compartment; and at least one door having an end, the door having a first position for allowing the flow of air into the passage and a second position for preventing the flow of air into the passage;

the end of the door including a seal for sealing against the housing when the door is in the second position, the seal including primary sealing means and secondary sealing means for contacting the housing when the door is in the second position so as to form primary and secondary seals at the end of the door.

\* \* \* \* \*